US010030181B2

(12) United States Patent
Park et al.

(10) Patent No.: US 10,030,181 B2
(45) Date of Patent: Jul. 24, 2018

(54) MODIFIED POLYVINYL ALCOHOL RESINS AND ADHESIVE, POLARIZER, AND DISPLAY DEVICE CONTAINING THE SAME

(71) Applicant: LG CHEM, LTD., Seoul (KR)

(72) Inventors: Seong-Jun Park, Daejeon (KR); Ki-Ok Kwon, Daejeon (KR); Kyun-Il Rah, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/995,009

(22) Filed: Jan. 13, 2016

(65) Prior Publication Data

US 2016/0130483 A1   May 12, 2016

Related U.S. Application Data

(63) Continuation of application No. 13/201,812, filed as application No. PCT/KR2010/001091 on Feb. 22, 2010.

(30) Foreign Application Priority Data

Feb. 20, 2009 (KR) .................. 10-2009-0014468

(51) Int. Cl.
  *C09J 129/04* (2006.01)
  *C09J 151/00* (2006.01)
  *G02B 5/30* (2006.01)
  *G02B 1/14* (2015.01)

(52) U.S. Cl.
  CPC ......... *C09J 151/003* (2013.01); *C09J 129/04* (2013.01); *G02B 1/14* (2015.01); *G02B 5/305* (2013.01); *G02B 5/3033* (2013.01); *Y10T 428/31515* (2015.04); *Y10T 428/31935* (2015.04)

(58) Field of Classification Search
  CPC ...... C09J 129/04; C09J 129/06; C09J 129/08; C09J 151/003; C07D 215/40; C07D 401/12; C07D 471/04; C07D 471/14; G02B 5/3033; G02B 5/305; G02B 1/14; Y10T 428/31515; Y10T 428/31935
  See application file for complete search history.

(56) References Cited

U.S. PATENT DOCUMENTS

| | | | | |
|---|---|---|---|---|
| 4,350,788 | A * | 9/1982 | Shimokawa | C08L 31/04 524/309 |
| 5,010,134 | A | 4/1991 | Chiang et al. | |
| 2006/0154173 | A1 * | 7/2006 | Ishigaki | G03F 7/0048 430/270.1 |
| 2007/0008459 | A1 * | 1/2007 | Park | G02F 1/133528 349/96 |
| 2007/0148483 | A1 | 6/2007 | Tomoguchi et al. | |
| 2009/0040611 | A1 | 2/2009 | Kitamura et al. | |
| 2010/0143720 | A1 * | 6/2010 | Asanuma | C04B 35/4682 428/402 |

FOREIGN PATENT DOCUMENTS

| | | |
|---|---|---|
| CN | 101280141 | 10/2008 |
| EP | 1958985 A | 8/2008 |
| JP | 58-11931 A | 1/1983 |
| JP | 04-105988 | 4/1992 |
| JP | 4-255702 A | 9/1992 |
| JP | 07-198945 | 8/1995 |
| JP | 11-079927 A | 3/1999 |
| JP | 3681572 | 5/2005 |
| JP | 2005189615 A | 7/2005 |
| JP | 2008143918 A | 6/2008 |
| JP | H07-198945 | * 1/2009 |
| KR | 10-20050063688 | 6/2005 |
| KR | 20060088245 A | 8/2006 |
| KR | 10-20060133215 | 12/2006 |
| KR | 10-0814306 | 3/2008 |
| KR | 10-20080066732 | 7/2008 |
| KR | 10-20080072570 | 8/2008 |
| KR | 10-20090015801 | 2/2009 |
| WO | PCTJP08059353 | 5/2008 |
| WO | WO 2008/1432876 | * 12/2009 |

OTHER PUBLICATIONS

JP H07-198945 machine translation retrieved May 1, 2016.*
Chemistry of Epoxy compounds.*
Polyvinyl Alchol (PVA).*
Effects of Gamma Radiation on Polymer in Solution Poly(vinyl Alcohol) Partially Acetalized with Glyoxylic Acid NPL Document, retrieved Nov. 1, 2017.*
Polyvinyl Alcohol (PVA) NPL document, retrieved—Apr. 14, 2015.
Chemistry of Epoxy Compounds NPL Document, retrieved Apr. 14, 2015.
Machine Translation of H07-198945, Kitamura, retrieved Apr. 14, 2015.

(Continued)

*Primary Examiner* — Michael B Nelson
(74) *Attorney, Agent, or Firm* — Dentons US LLP

(57) ABSTRACT

Provided are a modified polyvinyl alcohol-based resin with an acrylic group introduced thereto and including a hydroxyl group formed during the introduction of the acrylic group, an adhesive including the modified polyvinyl alcohol-based resin having excellent adhesion, humidity resistance, and water resistance, an adhesive including a polyvinyl alcohol-based resin, and a compound having an epoxy group, and an acrylic group, a polarizing plate and an image display device including the adhesive. The adhesive for a polarizing plate according to an embodiment of the present invention has excellent adhesion, humidity resistance, and water resistance as well as having excellent solubility with respect to water and an increase in adhesion while physical properties of a typical polyvinyl alcohol-based resin are maintained.

8 Claims, No Drawings

(56) References Cited

OTHER PUBLICATIONS

Translation of KR 10-20060133215, Kim et al. Dec. 26, 2006.
Derwent abstract of JP 04-105988.

* cited by examiner

MODIFIED POLYVINYL ALCOHOL RESINS AND ADHESIVE, POLARIZER, AND DISPLAY DEVICE CONTAINING THE SAME

This application is a Continuation of U.S. patent application Ser. No. 13/201,812, filed Aug. 16, 2011, which is a National Stage Entry of International Application No. PCT/KR2010/001091, filed Feb. 22, 2010, and claims priority to and the benefit of Korean Patent Application No. 10-2009-0014468, filed on Feb. 20, 2009, which are hereby incorporated by reference in their entirety for all purposes as if fully set forth herein.

TECHNICAL FIELD

The present invention relates to a polyvinyl alcohol-based resin having improved adhesion, humidity resistance, and water resistance, an adhesive including the same, a polarizing plate, and a display device, and more particularly, to a modified polyvinyl alcohol-based resin with an acrylic group introduced thereto and having a hydroxyl group formed by the introduction of the acrylic group; an adhesive for a polarizing plate including the modified polyvinyl alcohol-based resin having excellent adhesion, humidity resistance, and water resistance; an adhesive for a polarizing plate including a polyvinyl alcohol-based resin and a compound having an epoxy group and an acrylic group; a polarizing plate and a display device including the adhesive for a polarizing plate.

BACKGROUND ART

A polarizing plate, used in various image display devices such as a liquid crystal display (LCD) device, a plasma display panel (PDP), and an electroluminescent (EL) device, has a structure including a polarizer formed of a polyvinyl alcohol-based film and a transparent protective film formed on at least one surface of the polarizer. At this time, a water-based adhesive is used as an adhesive for a polarizing plate that is applied to a polarizing plate to bond the polarizer and the transparent protective film, and in particular, a polyvinyl alcohol-based adhesive is used, in which a cross-linking agent is mixed with a polyvinyl alcohol-based resin aqueous solution.

When a typical polyvinyl alcohol-based resin adhesive is used, the polarizer and transparent protective film adhere to each other by means of hydrogen bonds of the polyvinyl alcohol-based resin adhesive. However, a typical polyvinyl alcohol-based resin adhesive has limitations in terms of reductions of initial adhesion, humidity resistance, and water resistance. In order to improve such limitations, an adhesive for a polarizing plate including a cross-linking agent and a polyvinyl alcohol-based resin containing an acetoacetyl group was disclosed in Japanese Patent Laid-Open Publication No. 1995-198945. Also, an adhesive composition for a polarizing plate including polyvinyl alcohol, a copolymer resin (having a degree of copolymerization ranging between 1900 and 2500) of a hydrophobic vinyl monomer such as ethyl acrylate, methyl acrylate, acrylic acid, and methacrylic acid, and a metal hardener was disclosed in Korean Patent Laid-Open Publication No. 2006-88245.

Korean Patent Laid-Open Publication No. 2006-133215 disclosed a polyvinyl alcohol-based adhesive composition including 15 to 75 percent by weight of a water-soluble acrylate-based cross-linking agent of polyvinyl alcohol. However, there are limitations in the reduction of solubility of the adhesive with respect to water, and the reduction of adhesiveness due to the addition of a large amount of a water-insoluble acrylate cross-linking agent is combined in the adhesive composition of Korean Patent Laid-Open Publication No. 2006-133215.

However, as line speed (elongation rate) has recently increased in order to improve the productivity of the polarizing plate, there are also limitations in that the humidity resistance, water resistance, and adhesion of the adhesive for a polarizing plate using the polyvinyl alcohol-based resin containing a typical acetoacetyl group may be insufficient.

Therefore, an adhesive for bonding a polarizer and a protective film having improved solubility with respect to water, excellent adhesiveness with respect to the polarizer and the protective film, humidity resistance, and water resistance is required.

DISCLOSURE

Technical Problem

An aspect of the present invention provides a modified polyvinyl alcohol-based resin with an acrylic group introduced thereto and including a hydroxyl group formed by the introduction of the acrylic group.

Another aspect of the present invention provides an adhesive having excellent adhesiveness, humidity resistance, water resistance, and solubility with respect to water.

Another aspect of the present invention provides an adhesive for bonding a polarizer and a protective film (hereinafter, referred to as the 'adhesive for a polarizing plate').

Another aspect of the present invention provides an excellent water and humidity resistant polarizing plate including the adhesive for a polarizing plate and a display device including the polarizing plate.

Technical Solution

According to an aspect of the present invention, there is provided a modified polyvinyl alcohol-based resin with an acrylic group introduced thereto and including a hydroxyl group formed by the introduction of the acrylic group.

According to another aspect of the present invention, there is provided an adhesive for a polarizing plate including the modified polyvinyl alcohol-based resin with an acrylic group introduced thereto and including a hydroxyl group formed by the introduction of the acrylic group.

According to another aspect of the present invention, there is provided an adhesive for a polarizing plate including 100 parts by weight of the polyvinyl alcohol-based resin and 0.001 to 10 parts by weight of the compound having epoxy and acrylic groups.

According to another aspect of the present invention, there is provided a polarizing plate including a polarizer and a protective film adhered to each other with the adhesive for a polarizing plate according to an embodiment of the present invention.

According to another aspect of the present invention, there is provided a display device including the polarizing plate according to an embodiment of the present invention.

Advantageous Effects

An adhesive for a polarizing plate including a modified polyvinyl alcohol-based resin with an acrylic group introduced thereto and having a hydroxyl group formed by the introduction of the acrylic group or an adhesive for a polarizing plate including a polyvinyl alcohol-based resin and a compound having an epoxy group and an acrylic group according to an embodiment of the present invention has excellent adhesion, humidity resistance, and water resistance as well as having excellent solubility with respect to water.

That is, an acrylic resin is an organic solvent-soluble resin which is not appropriate for using as an adhesive for a polarizing plate because of low solubility with respect to water. Also, a resin, in which a hydrophobic monomer such as (meth)acrylic acid or (meth)acrylate is copolymerized with a typical polyvinyl alcohol-based resin, is impossible to use as a water-based adhesive for a polarizing plate because of the low solubility thereof with respect to water. However, the adhesive for a polarizing plate according to the present invention has excellent adhesiveness, water resistance, and humidity resistance as well as having excellent solubility with respect to water because adhesion, water resistance, humidity resistance and solubility with respect to water by means of a hydroxyl group are complementarily optimized. Therefore, water resistance and humidity resistance of polarizing plate fabricated using the adhesive of the present invention and a display device including the polarizing plate are improved.

BEST MODE

Exemplary embodiments of the present invention will now be described in detail.

A modified polyvinyl alcohol-based resin (hereinafter, referred to as the 'AH-PVA') has an acrylic group introduced thereto and includes a hydroxyl group formed by the introduction of the acrylic group. The modified polyvinyl alcohol-based resin with an acrylic group introduced thereto and having a hydroxyl group formed by the introduction of the acrylic group includes a repeating unit of the following Chemical Formula A, and at least one repeating unit of the following Chemical Formula B1, B2, and B3. For example, the modified polyvinyl alcohol-based resin with an acrylic group introduced thereto and having a hydroxyl group formed by the introduction of the acrylic group may further include a repeating unit of the following Chemical Formula C.

[Chemical Formula A]

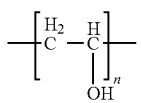

[Chemical Formula B1]

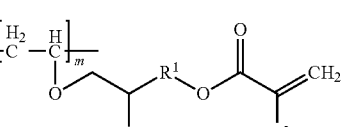

[Chemical Formula B2]

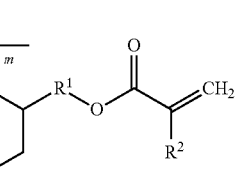

[Chemical Formula B3]

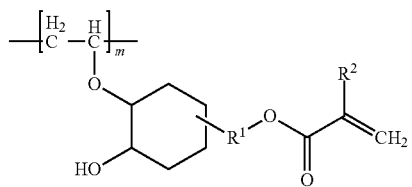

[Chemical Formula C]

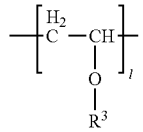

An AHA-PVA resin including repeating units of Chemical Formulas A, B1, and C according to the present invention may be represented as Chemical Formula I below. However, the AHA-PVA resin is not limited thereto.

[Chemical Formula I]

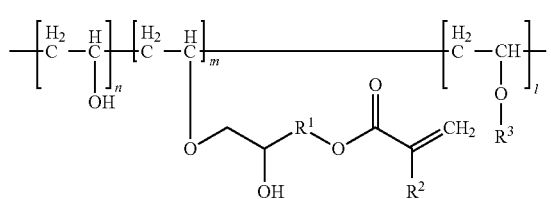

An AHA-PVA resin including repeating units of Chemical Formulas A, B2, and C may be represented as Chemical Formula II below.

[Chemical Formula II]

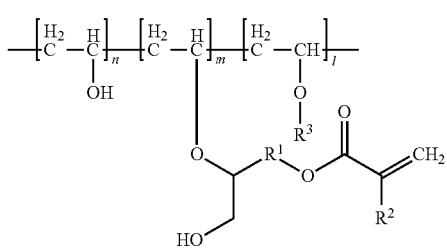

An AHA-PVA resin including repeating units of Chemical Formulas A, B3, and C may be expressed as Chemical Formula III below.

[Chemical Formula III]

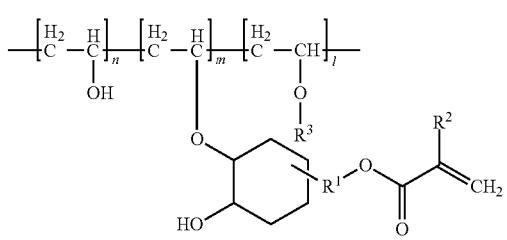

When the AHA-PVA resin includes a repeating unit of Chemical Formula A and at least one repeating unit of Chemical Formulas B1, B2, and B3, the number (n) of the repeating unit of Chemical Formula A in the AH-PVA resin is an integer between 490 to 1700, and the number (m) of the repeating unit represented as Chemical Formula B1, B2, and/or B3 is an integer between 10 and 900, for example, 10 and 400. The number (m) may be an integer between 50 and 180, and the sum of n and m is an integer between 500 and 1800.

Further, according to an embodiment of the present invention, when the AH-PVA resin includes a repeating unit of Chemical Formula A, at least one repeating unit of Chemical Formulas B1, B2, and B3, and a repeating unit of Chemical Formula C, the sum of the number (n) of the repeating unit of Chemical Formula A and the number (l) of the repeating unit of Chemical Formula C in the AH-PVA resin is an integer between 490 and 1700. The number (l) of the repeating unit of Chemical Formula C in the sum of n and l is an integer between 1 and 80. The number (m) of at least one repeating unit of Chemical Formulas B1, B2, and B3 is an integer between 10 and 900, for example between 10 and 400. The number (m) may be an integer between 50 and 180, and the sum of n, m, and l may be an integer between 500 and 1800. When the AH-PVA resin includes the repeating units of Chemical Formula A, Chemical Formulas B1, B2, and/or B3, and Chemical Formula C, a modified polyvinyl alcohol-based resin is used as a PVA resin in which a portion of the PVA resin is at least one group selected from the group consisting of an acetoacetyl group, a carboxylic acid group, an acrylic group, or a urethane group. $R^1$ is substituted or unsubstituted $C_1$-$C_{20}$ alkandiyl, preferably, $C_1$-$C_{15}$ alkandiyl, more preferably, $C_1$-$C_{10}$ alkandiyl, further preferably, $C_1$-$C_5$ alkandiyl, a substituted or unsubstituted 1- to 7-membered cyclic group, a substituted or unsubstituted 1- to 7-membered heterocyclic group including a heteroatom selected from the group consisting of N, S, or O, a substituted or unsubstituted $C_6$-$C_{14}$ aromatic group, or a substituted or unsubstituted 1- to 7-membered heteroaromatic group including at least one heteroatom selected from the group consisting of N, S, or O. $R^2$ is a substituted or unsubstituted $C_1$-$C_{20}$ alkyl group, preferably, a $C_1$-$C_{15}$ alkyl group, more preferably, $C_1$-$C_{10}$ alkyl group, further preferably, a $C_1$-$C_5$ alkyl group, a substituted or unsubstituted 1- to 7-membered cyclic group, a substituted or unsubstituted 1- to 7-membered heterocyclic group including at least one heteroatom selected from the group consisting of N, S, or O, a substituted or unsubstituted $C_6$-$C_{14}$ aromatic group, or a substituted or unsubstituted 1- to 7-membered heteroaromatic group including a heteroatom selected from the group consisting of N, S, or O. When $R^1$ and $R^2$ are substituted with a substituent, the substituent is a $C_1$-$C_{20}$ alkyl group, preferably, a $C_1$-$C_{15}$ alkyl group, more preferably, a $C_1$-$C_{10}$ alkyl group, for example, a $C_1$-$C_5$ alkyl group, a halogen atom selected from the group consisting of F, Cl, Br, or I, a 1- to 7-membered cyclic group, a 1- to 7-membered heterocyclic group including at least one heteroatom selected from the group consisting of N, S, or O, a $C_6$-$C_{14}$ aromatic group, or a 1- to 7-membered heteroaromatic group including at least one heteroatom selected from the group consisting of N, S, or O. $R^3$ may be an acetoacetyl group, a carboxylic acid group, an acrylic group, or a urethane group.

In Chemical Formulas I to III, although polymers are represented in which the repeating units of Chemical Formula A, Chemical Formulas B1, B2, and/or B3, and optional Chemical Formula C are sequentially connected for the sake of convenience, Chemical Formula A, Chemical Formulas B1, B2, and/or B3, and optional Chemical Formula C may be randomly positioned in the polymers.

At least one repeating unit of Chemical Formulas B1, B2, and B3 in the AH-PVA resin is introduced in a range of 0.1 mol % to 50 mol % of the PVA resin, preferably, in a range of 0.1 mol % to 20 mol %, and more preferably, in a range of 0.1 mol % to 10 mol % with respect to 100 mol % of total PVA resin. When the introduced amount of at least one repeating unit of Chemical Formulas B1, B2, and B3 in the PVA resin is less than 0.1 mol %, there may be no increases in adhesion, humidity resistance, and water resistance effects by the introduction of the repeating unit. When the introduced amount is more than 50 mol %, solubility with respect to water may be reduced and adhesion may rather decrease.

The AH-PVA may be obtained from a modification reaction of a polyvinyl alcohol-based resin by a compound having epoxy and acrylic groups. The polyvinyl alcohol-based resin (hereinafter, referred to as the 'PVA') is not particularly limited and any polyvinyl alcohol-based resin known in the art may be used as long as it is used in a typical adhesive for polarizer and protective film. Types of the polyvinyl alcohol-based resin are not particularly limited. Examples of the polyvinyl alcohol-based resin may be a polyvinyl alcohol resin or a modified polyvinyl alcohol resin which the polyvinyl alcohol resin is modified with at least one selected from the group consisting of an acetoacetyl group, a carboxylic acid group, an acrylic group, or a urethane group. However, the polyvinyl alcohol-based resin is not limited thereto. When the modified polyvinyl alcohol resin (modified PAV) which the polyvinyl alcohol resin is modified with at least one selected from the group consisting of an acetoacetyl group, a carboxylic acid group, an acrylic group, or a urethane group is used, the polyvinyl alcohol resin can be modified with at least one selected from the group consisting of an acetoacetyl group, a carboxylic acid group, an acrylic group, or a urethane group at most 15 mol %, preferably in a range of 0.01 mol % to 15 mol %, more preferably in a range of 0.5 mol % to 8 mol % of the polyvinyl alcohol resin. However, the PVA is not limited thereto. The PVA may include the repeating unit C of Chemical Formulas I to III. The modified PVA which is modified with at least one of an acetoacetyl group, a carboxylic acid group, an acrylic group, or a urethane group, and the foregoing modification mol % are common in the art.

Average degrees of polymerization of the polyvinyl alcohol-based resin and modified polyvinyl alcohol-based resin (AH-PVA resin) used in the foregoing reaction may be in a range of 500 to 1800. When the average degrees of polymerization are in a range of 500 to 1800, excellent physical properties in terms of viscosity, solid content, and adhesion according to an amount of use are obtained.

Meanwhile, a number-average molecular weight (Mn) of the polyvinyl alcohol-based resin used in the foregoing reaction may be 3000 to 12000, and/or a weight-average molecular weight (Mw) of the polyvinyl alcohol-based resin used in the foregoing reaction may be 20000 to 100000. The PVA having the foregoing ranges of the number-average and/or weight-average molecular weights is appropriate for use as an adhesive in terms of viscosity as well as having sufficient water resistance after cross-linking.

A compound of the following Chemical Formula 1 or 2 may be used as the compound having epoxy and acrylic groups.

[Chemical Formula 1]

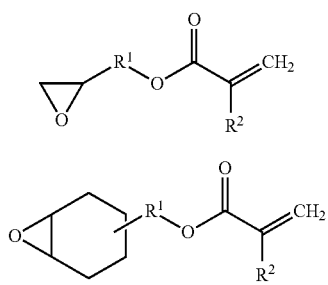

[Chemical Formula 2]

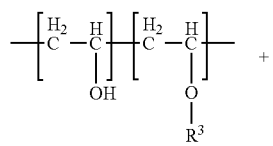

(In Chemical Formulas 1 and 2, $R^1$ is substituted or unsubstituted $C_1$-$C_{20}$ alkandiyl, preferably, $C_1$-$C_{15}$ alkandiyl, more preferably, $C_1$-$C_{10}$ alkandiyl, further preferably, $C_1$-$C_5$ alkandiyl, a substituted or unsubstituted 1- to 7-membered cyclic group, a substituted or unsubstituted 1- to 7-membered heterocyclic group including a heteroatom selected from the group consisting of N, S, or O, a substituted or unsubstituted $C_6$-$C_{14}$ aromatic group, or a substituted or unsubstituted 1- to 7-membered heteroaromatic group including at least one heteroatom selected from the group consisting of N, S, or O. $R^2$ is a substituted or unsubstituted $C_1$-$C_{20}$ alkyl group, preferably, a $C_1$-$C_{15}$ alkyl group, more preferably, $C_1$-$C_{10}$ alkyl group, further preferably, a $C_1$-$C_5$ alkyl group, a substituted or unsubstituted 1- to 7-membered cyclic group, a substituted or unsubstituted 1- to 7-membered heterocyclic group including at least one heteroatom selected from the group consisting of N, S, or O, a substituted or unsubstituted $C_6$-$C_{14}$ aromatic group, or a substituted or unsubstituted 1- to 7-membered heteroaromatic group including a heteroatom selected from the group consisting of N, S, or O. When $R^1$ and $R^2$ are substituted with a substituent, the substituent is a $C_1$-$C_{20}$ alkyl group, preferably, a $C_1$-$C_{15}$ alkyl group, more preferably, a $C_1$-$C_{10}$ alkyl group, further preferably, a $C_1$-$C_5$ alkyl group, a halogen atom selected from the group consisting of F, Cl, Br, or I, a 1- to 7-membered cyclic group, a 1- to 7-membered heterocyclic group including at least one heteroatom selected from the group consisting of N, S, or O, a $C_6$-$C_{14}$ aromatic group, or a 1- to 7-membered heteroaromatic group including at least one heteroatom selected from the group consisting of N, S, or O.

The AH-PVA resin according to an embodiment of the present invention may be prepared as the following Reaction Formulas 1 to 3.

[Reaction Formula 1]

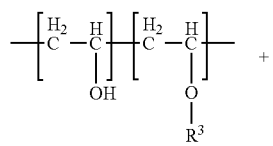

(Chemical Formula 3)

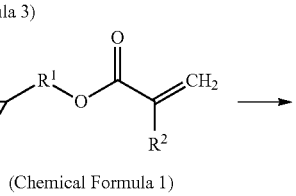

(Chemical Formula 1)

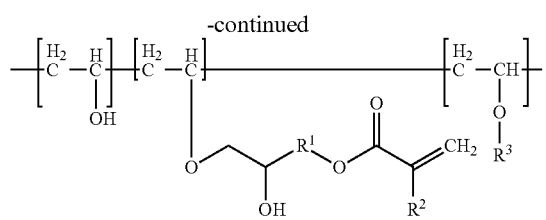

(Chemical Formula I)

[Reaction Formula 2]

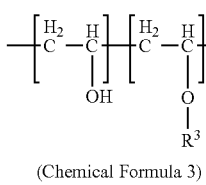

(Chemical Formula 3)

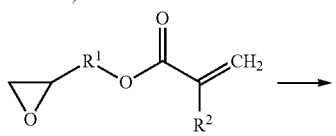

(Chemical Formula 1)

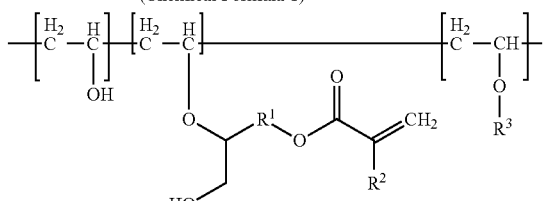

(Chemical Formula II)

[Reaction Formula 3]

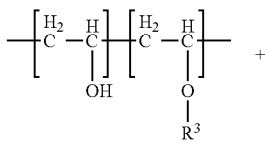

(Chemical Formula 3)

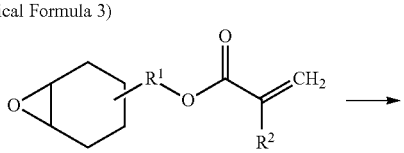

(Chemical Formula 2)

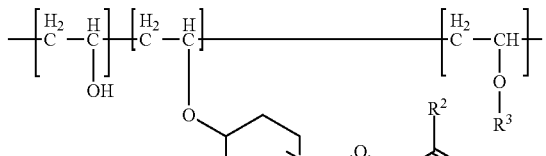

(Chemical Formula III)

Reaction Formulas 1 to 3 represent processes of converting the polyvinyl alcohol-based resins to the AH-PVA resins and the numbers of repeating units are not described therein. Chemical Formula 3 in Reaction Formulas 1 to 3 is a polyvinyl alcohol-based resin and a polyvinyl alcohol resin or a modified polyvinyl alcohol-based resin in which a polyvinyl alcohol resin is modified with at least one selected from the group consisting of an acetoacetyl group, a carboxylic acid group, an acrylic group, or a urethane group may be used therefor. When the polyvinyl alcohol resin that is not modified with an acetoacetyl group, a carboxylic acid group, an acrylic group, or a urethane group is used as the polyvinyl alcohol-based resin, the repeating unit C does not exist in Chemical Formula 3.

In the reactions between PVA of Chemical Formula 3 and a compound having epoxy and acrylic groups of Chemical Formula 1 or 2 as shown in Reaction Formulas 1 to 3, an OH group of PVA and/or a $R^3$ group attack an epoxy group, and then an acrylic group is introduced into the PVA resin by means of an epoxy ring-opening reaction and a hydroxyl group (—OH) is formed at the same time. The epoxy ring-opening reaction is conducted in a basic or acidic condition. Particularly, in the epoxy ring-opening reaction, nucleophiles attack less hindered carbons under a basic condition and attack more hindered carbons under an acidic condition. Therefore, when the compound of Chemical Formula 1 is used as the compound having epoxy and acrylic groups, the reaction is performed like Reaction Formula 1 under a basic condition and is performed like Reaction Formula 2 under an acidic condition.

Meanwhile, when the compound of Chemical Formula 2 is used as the compound having epoxy and acrylic groups, the reaction may be performed by attacking any of two C—O bonds of an epoxy ring and opening of the epoxy ring because steric hindrance of cyclohexane combined with an epoxy group with respect to carbon is not much different.

Particularly, as shown in Reaction Formulas 1 to 3, a polyvinyl alcohol resin (Chemical Formula 3) and a compound having epoxy and acrylic groups (Chemical Formula 1 or 2) are dissolved in water and react at a temperature range of room temperature (e.g., about 20° C. to 25° C.) to 70° C. for 10 hours to 30 hours such that a polyvinyl alcohol-based resin in which an acrylic group is introduced thereto and an —OH group is formed at the same time with the introduction of an acrylic group (Chemical Formulas I to III) may be obtained. The amount of water is not defined and is controlled properly by a person skilled in this art based on the generally known for a copolymerization (modification reaction). Meanwhile, the reaction condition has to be controlled to a basic or an acidic condition. When the reaction is performed under a basic condition, a pH is controlled to a range of 13 to 14 by means of NaOH, KOH, etc. However, the pH control is not limited thereto. When the reaction is performed under an acidic condition, a pH is controlled to a range of 1 to 2 by means of HCl, $H_2SO_4$, $HNO_3$, etc. However, the pH control is not limited thereto.

By the foregoing reaction, the polyvinyl alcohol-based resin in which an acrylic group is introduced into a backbone of the resin and an —OH group is formed at the same with the introduction of the acrylic group are obtained. Thus, the polyvinyl alcohol-based resin, in which an acrylic group is introduced into a single backbone of a resin and an —OH group is formed at the same time, has excellent adhesion, water resistance, and humidity resistance as well as having excellent solubility with respect to water because adhesion, water resistance, and humidity resistance provided by the acrylic group and solubility with respect to water provided by the hydroxyl group are complimentarily optimized.

Therefore, in another aspect of the present invention, an adhesive including the AH-PVA resin, particularly an adhesive for a polarizing plate, is provided.

In another aspect of the present invention, an adhesive for a polarizing plate including 100 parts by weight of a polyvinyl alcohol-based resin and 0.001 to 10 parts by weight of a compound having epoxy and acrylic groups, for example, 0.001 to 1 part by weight of a compound having epoxy and acrylic groups, is also provided. The adhesive including the polyvinyl alcohol-based resin and the compound having epoxy and acrylic groups in a small amount also has improved solubility with respect to water and has excellent adhesion, water resistance, and humidity resistance.

A polyvinyl alcohol-based resin used in an adhesive including a polyvinyl alcohol-based resin and a compound having epoxy and acrylic groups provided from another embodiment of the present invention is also not particularly limited like the polyvinyl alcohol-based resin used during the preparation of the AH-PVA resin, and any polyvinyl alcohol-based adhesive known in the art may be used as long as it is typically used for the adhesion of polarizer and protective film. That is, any polyvinyl alcohol-based resin may be used as long as it may be used during the preparation of the AH-PVA resin, and all the foregoing descriptions may be applied identically.

The compound of Chemical Formula 1 or 2 may be used as the compound having epoxy and acrylic groups. When a content of the compound having epoxy and acrylic groups is less than 0.001 parts by weight with respect to 100 parts by weight of the polyvinyl alcohol-based resin, there are no increases of adhesiveness, humidity resistance, and water resistance effects due to the introduction of the acrylic group. When the content of the compound having epoxy and acrylic groups is more than 10 parts by weight with respect to 100 parts by weight of the polyvinyl alcohol-based resin, an adhesive for a uniform polarizing plate is not obtained due to the reduction of solubility with respect to water, and solution stability and adhesion may be low.

An adhesive for a polarizing plate according to an embodiment of the present invention is a water-based adhesive which may be prepared by dissolving the AH-PVA resin or the PVA resin and compound having epoxy and acrylic groups in water.

A curing initiator may be further added to the adhesive for a polarizing plate if necessary.

A 2,2'-azo-bis(isobutyronitrile)(AIBN)-based initiator, a persulfate-based initiator, and a Ciba-Geiger AG Darocure and/or Igacure series initiator may be used as a curing initiator. Any initiator known in the art may be used as the AIBN or the persulfate-based initiator as long as it is used as a water base. Examples of the AIBN-based initiator may be 2,2'-azobis[2-(2-imidazolin-2-yl)propane]dihydrochloride, 2,2'-azobis[2-(2-imidazolin-2-yl)propane]disulfate dihydrate, 2,2'-azobis[N-(2-carboxyethyl)-2-methylpropionamide], 2,2'-azobis[2-(3,4,5,6-tetrahydropyrrimidin-2-yl) propane]dihydrochloride, 2,2'-azobis{2-[1-(2-hydroxyethyl)-2-yl]propane}dihydrochloride, 2,2'-azobis{2-methyl-N-[2-(hydroxybuthyl)]propionamide}, 2,2'-azobis{2-methyl-N-[2-(hydroxyethyl)]propionamide}, 2,2'-azobis(N-buthyl-2-methylpropionamide), etc. However, the AIBN-based initiator is not limited thereto. Examples of the persulfate-based initiator may be potassium persulfate, ammonium persulfate, etc. However, the persulfate-based initiator is not limited thereto. Examples of the Ciba-Geigy AG Darocure and/or Igacure series initiator may be hydroxy-1-[4-(hydroxyethoxy)phenol]-2-methyl-1-propanone (Darocure 2959), 2-hydroxy-2-methyl-1-phenylpropane-1-on (Darocure 1173), 1-(4-isopropylphenyl)-2-hydroxy-2-methylpropane-1-on (Darocure 1116), a mixture of bis-(2,6-dimethoxybenzoyl)-2,4,4-trimethylpentyl phosphine oxide and 2-hydroxy-2-methyl-1-phenylpropane-1-on in a weight ratio of 25:75 (Irgacure 1700), 1-[4-(2-hydroxyethoxy)-phenyl]-2-hydroxy-di-2-methyl-1-propane-1-on (Irgacure 2959), 1-hydroxycyclohexylphenylketone (Irgacure 184), 2,2-dimethoxy-2-phenylacetophenone (Irgacure 651), etc. However, the Ciba-Geigy AG Darocure and/or Igacure series initiator is not limited thereto.

The curing initiator may be added to the adhesive for a polarizing plate in a maximum of 10 wt % based on a total weight of the adhesive. The curing initiator is a component added optionally as needed, and although a lower limit of an added amount is not limited, the curing initiator may be added in a range of 0.01 wt % to 10 wt %, for example, in a range of 0.01 wt % to 1 wt % based on the total weight of the adhesive. When the added amount of the curing initiator is less than 0.01 wt %, effects due to the addition of the curing initiator are insufficient, and when the added amount of the curing initiator is more than 10 wt %, the additive remaining after the reaction may have an adverse effect on adhesion.

Various coupling agents, a cross-linking agent, a tackifier, an ultraviolet absorber, an antioxidant, or various stabilizers that are generally used in the adhesive for a polarizing plate may be combined with the adhesive if necessary. The use amounts thereof are also common in the art and appropriate amounts may be added as needed by those skilled in the art.

In the adhesive for a polarizing plate, a concentration of the polyvinyl alcohol-based resin is in a range of 1 wt % to 50 wt %, and for example, may be in a range of 1 wt % to 20 wt % (particularly, a concentration of the AH-PVA in the adhesive including the AH-PVA and a concentration of the polyvinyl alcohol-based resin in the adhesive including the polyvinyl alcohol-based resin and the compound having epoxy and acrylic groups). An adhesive having a polyvinyl alcohol-based resin concentration of 1 wt % to 50 wt % may have appropriate viscosity in terms of coverage and handling of the adhesive as well as adhesiveness.

Polarizer and protective films are bonded together by using the adhesive for a polarizing plate. The adhesive for a polarizing plate may be used for bonding any polarizer and protective film generally known in the art. For example, a polyvinyl alcohol-based resin polarizer is generally used as the polarizer. However, the polarizer is not limited thereto. Any polymer film having excellent optical transparency, mechanical strength, thermal stability, isotropy, adhesiveness to the PVA polarizer may be used as the protective film. Examples of the protective film may be a film formed of a polyester-based polymer such as polyethylene terephthalate or polyethylene naphthalate, a styrene-based polymer such as polystyrene or a copolymer of acrylonitrile and styrene, a cellulose-based polymer such as diacetyl cellulose or triacetyl cellulose, a polyethersulfone-based polymer, a polycarbonate-based polymer, an acrylic-based polymer such as polymethylmethacrylate, a polyolefin-based polymer such as polyethylene, polypropylene, a copolymer of ethylene and propylene, an amide-based polymer such as nylon or aromatic polyamide, an imide-based polymer, a sulfone-based polymer, a polyetheretherketone-based polymer, a polyphenylene sulfide-based polymer, a vinyl alcohol-based polymer, a vinylidene chloride-based polymer, a vinyl butyral-based polymer, an arylate-based polymer, a polyoxymethylene-based polymer, an epoxy-based polymer, and mixtures thereof. However, the protective film is not limited thereto.

Particularly, a cellulose-based film such as a cellulose ester film, a triacetyl cellulose film (TAC film), a cellulose propionate film, a cellulose acetate propionate film, a cellulose diacetate film, a cellulose acetate butylate film, a polycarbonate-based film (PC film), a polystyrene-based film, a polyarylate-based film, a norbornene resin-based film, or a polysulfone-based film may be used in consideration of transparency, mechanical properties, free of optical anisotropy, etc. A triacetyl cellulose film (TAC film) or a polycarbonate film (PC film) may be used because of the ease of film preparation and good processability. For example, the TAC film may be used because of polarization properties or durability.

The protective film may be subjected to a surface modification treatment in order to improve adhesion with respect to the polarizer to which the protective film adheres. Specific examples of the surface treatment may be a corona treatment, a glow discharge treatment, a flame treatment, an acid treatment, an alkaline treatment, a plasma treatment, an ultrasonic treatment, an ultraviolet radiation treatment, etc. However, the surface modification treatment is not limited thereto. Also, a method of providing an undercoat layer to the protective film may be used in order to improve adhesiveness.

A polarizing plate prepared by bonding the polarizer and the protective film using the adhesive according to an embodiment of the present invention has excellent water resistance and humidity resistance because of the excellent adhesion of the adhesive.

According to another embodiment of the present invention, a display device including the polarizing plate according to the present invention is provided. Examples of the display device may be a liquid crystal display (LCD) device, an electroluminescent (EL) display device, a plasma display panel (PDP), etc. However, the display device is not limited thereto.

Hereinafter, the present invention is described in more detail with reference to Examples. However, the following Examples are provided for an understanding of the present invention, and the present invention is not limited to the following Examples.

EXAMPLE 1

A polyvinyl alcohol resin (average degree of polymerization of 600, degree of saponification of 95% to 97%, Nippon Synthetic Chemical Industry Co., Ltd., product Z100) was dissolved in pure water at 80° C. for 1 hour, and then 60 parts by weight of glycidylmethacrylate (GMA) was added with respect to 100 parts by weight of the polyvinyl alcohol resin and stirred overnight at room temperature. As a result, a reaction like that of Reaction Formula 2 was performed such that GMA was chemically combined with the polyvinyl alcohol resin. Meanwhile, a pH level was controlled to about 1 to 2 by adding concentrated HCl during the reaction. An AH-PVA resin was obtained by separating and drying an obtained reaction product. Thereafter, the AH-PVA resin was analyzed by Fourier transform infrared spectroscopy (FT-IR) and the presences of the introduced acrylate and formed OH— functional group were confirmed. Also, a content of the introduced GMA was calculated by using nuclear magnetic resonance (NMR) and a polyvinyl alcohol resin was obtained in which 4.5 mol % of GMA was introduced.

Thereafter, a water-based adhesive was prepared by dissolving the prepared AH-PVA resin (average degree of polymerization of 600, degree of saponification of 95% to 97%, GMA content of 4.5 mol %) in a concentration of 4 wt % in pure water. The composition, contents, and physical properties of the adhesive are presented in Table 1 below.

A 80 μm thick saponified triacetyl cellulose (TAC) protective film was adhered to one surface of a 75 μm thick polyvinyl alcohol polarizer using the obtained water-based adhesive and laminated, and then a polarizing plate was fabricated by drying at 80° C. for 5 minutes.

Thereafter, the adhesion, solubility with respect to water, and water resistance of the polarizing plate were evaluated and are presented in Table 1 below.

EXAMPLE 2

A polyvinyl alcohol resin (average degree of polymerization of 1700, degree of saponification of 95% to 97%, Nippon Synthetic Chemical Industry Co., Ltd., product Z320) was dissolved in pure water at 80° C. for 1 hour, and then 40 parts by weight of glycidylmethacrylate (GMA) was added with respect to 100 parts by weight of the polyvinyl alcohol resin and stirred overnight at room temperature. As a result, GMA was chemically combined with the polyvinyl alcohol resin according to Reaction Formula 1. Meanwhile, a pH level was controlled to about 13 to 14 by adding 1N NaOH during the reaction.

Thereafter, an AH-PVA resin was analyzed by FT-IR and the presences of the introduced acrylate and formed OH-functional group were confirmed. Also, a content of the introduced GMA was calculated by using NMR and a polyvinyl alcohol resin was obtained in which 2.0 mol % of GMA was introduced.

A water-based adhesive was prepared by dissolving the prepared AH-PVA resin (average degree of polymerization of 1700, degree of saponification of 95% to 97%, GMA content of 2.0 mol %) in a concentration of 4 wt % in pure water and by adding 15 parts by weight of a titanium amine complex (DuPont product TYZOR TE) as a cross-linking agent with respect to 100 parts by weight of the polyvinyl alcohol resin. The composition, contents, and physical properties of the adhesive are presented in Table 1 below.

Except for using the prepared water-based adhesive, a polarizing plate was fabricated using the method of Example 1. Thereafter, the adhesion, solubility with respect to water, and water resistance of the polarizing plate were evaluated and are presented in Table 1 below.

EXAMPLE 3

A polyvinyl alcohol resin (average degree of polymerization of 1100, degree of saponification of 99%, Nippon Synthetic Chemical Industry Co., Ltd., product Z210) was dissolved in pure water at 80° C. for 1 hour, and then 5 parts by weight of glycidylmethacrylate (GMA) was added with respect to 100 parts by weight of the polyvinyl alcohol resin and stirred overnight at room temperature. As a result, GMA was chemically combined with the polyvinyl alcohol resin according to Reaction Formula 1. Meanwhile, a pH level was controlled to about 1 to 2 by adding concentrated HCl during the reaction.

Thereafter, an AH-PVA resin was analyzed by FT-IR and the presences of the introduced acrylate and formed OH-functional group were confirmed. Also, a content of the introduced GMA was calculated by using NMR and a polyvinyl alcohol resin was obtained in which 0.15 mol % of GMA was introduced.

A water-based adhesive was prepared by dissolving the prepared AH-PVA resin (average degree of polymerization of 1100, degree of saponification of 99%, GMA content of 0.15 mol %) in a concentration of 4 wt % in pure water. The composition, contents, and physical properties of the adhesive are presented in Table 1 below.

Except for using the prepared water-based adhesive, a polarizing plate was fabricated using the method of Example 1. Thereafter, the adhesion, solubility with respect to water, and water resistance of the polarizing plate were evaluated and are presented in Table 1 below.

EXAMPLE 4

A polyvinyl alcohol resin (average degree of polymerization of 600, degree of saponification of 95% to 97%, Nippon Synthetic Chemical Industry Co., Ltd., product Z100) was dissolved in pure water at 80° C. for 1 hour, and then 60 parts by weight of glycidylmethacrylate (GMA) was added with respect to 100 parts by weight of the polyvinyl alcohol resin and stirred at 70° C. for 24 hours. As a result, GMA was chemically combined with the polyvinyl alcohol resin according to Reaction Formula 1. Meanwhile, a pH level was controlled to about 13 to 14 by adding 1N NaOH during the reaction.

Thereafter, an AH-PVA resin was analyzed by FT-IR and the presences of the introduced acrylate and formed OH-functional group were confirmed. Also, a content of the introduced GMA was calculated by using NMR and a polyvinyl alcohol resin was obtained in which 10.0 mol % of GMA was introduced.

A water-based adhesive was prepared by dissolving the prepared AH-PVA resin (average degree of polymerization of 600, degree of saponification of 95% to 97%, GMA content of 10.0 mol %) in a concentration of 4 wt % in pure water and by adding 15 parts by weight of a titanium amine complex (DuPont product TYZOR TE) as a cross-linking agent with respect to 100 parts by weight of the polyvinyl alcohol resin. The composition, contents, and physical properties of the adhesive are presented in Table 1 below.

Except for using the prepared water-based adhesive, a polarizing plate was fabricated using the method of Example 1. Thereafter, the adhesion, solubility with respect to water, and water resistance of the polarizing plate were evaluated and are presented in Table 1 below.

EXAMPLE 5

A polyvinyl alcohol resin (average degree of polymerization of 1700, degree of saponification of 95% to 97%, Nippon Synthetic Chemical Industry Co., Ltd., product Z320) was dissolved in pure water at 80° C. for 1 hour, and then a mixture of GMA and the polyvinyl alcohol resin was prepared by adding 0.001 parts by weight of GMA with respect to 100 parts by weight of the dissolved polyvinyl alcohol resin at room temperature. Thereafter, a water-based adhesive was prepared by dissolving the obtained mixture of GMA and polyvinyl alcohol resin in a concentration of 4 wt % (polyvinyl alcohol resin concentration of about 4 wt %) in pure water and by adding 20 parts by weight of a titanium amine complex (DuPont product TYZOR TE) as a cross-linking agent with respect to 100 parts by weight of the polyvinyl alcohol resin.

Except for using the prepared water-based adhesive, a polarizing plate was fabricated using the method of Example 1. Thereafter, the adhesion, solubility with respect to water, and water resistance of the polarizing plate were evaluated and are presented in Table 1 below.

EXAMPLE 6

A polyvinyl alcohol resin (average degree of polymerization of 1100, degree of saponification of 99%, Nippon Synthetic Chemical Industry Co., Ltd., product Z210) was dissolved in pure water at 80° C. for 1 hour, and then a mixture of GMA and the polyvinyl alcohol resin was prepared by adding 1.0 part by weight of GMA with respect to 100 parts by weight of the dissolved polyvinyl alcohol resin at room temperature. Thereafter, a water-based adhesive was prepared by dissolving the obtained mixture of GMA and polyvinyl alcohol resin in a concentration of 4 wt % (polyvinyl alcohol resin concentration of about 4 wt %) in pure water.

Except for using the prepared water-based adhesive, a polarizing plate was fabricated using the method of Example 1. The adhesion, solubility with respect to water, and water resistance of the polarizing plate were evaluated and are presented in Table 1 below.

EXAMPLE 7

A polyvinyl alcohol resin (average degree of polymerization of 600, degree of saponification of 95% to 97%, Nippon Synthetic Chemical Industry Co., Ltd., product Z100) was dissolved in pure water at 80° C. for 1 hour, and then a mixture of GMA and the polyvinyl alcohol resin was prepared by adding 10 parts by weight of GMA with respect to 100 parts by weight of the dissolved polyvinyl alcohol resin at room temperature. Thereafter, a water-based adhesive was prepared by dissolving the obtained mixture of GMA and polyvinyl alcohol resin in a concentration of 4 wt % (polyvinyl alcohol resin concentration of about 4 wt %) in pure water.

Except for using the prepared water-based adhesive, a polarizing plate was fabricated using the method of Example 1. The adhesion, solubility with respect to water, and water resistance of the polarizing plate were evaluated and are presented in Table 1 below.

EXAMPLE 8

A water-based adhesive was prepared by dissolving the AH-PVA resin prepared in Example 2 in pure water in a concentration of 4 wt %, and then by adding an AIBN-based initiator (Wako Pure Chemical Industries, Ltd. product VA-004) in a concentration of 0.1 wt %.

Except for using the prepared water-based adhesive, a polarizing plate was fabricated using the method of Example 1. The adhesion, solubility with respect to water, and water resistance of the polarizing plate were evaluated and are presented in Table 1 below.

EXAMPLE 9

A water-based adhesive was prepared by dissolving the AH-PVA resin prepared in Example 2 in pure water in a concentration of 4 wt %, and then by adding ammonium persulfate (Junsei Chemical Co., Ltd.) as a sulfate-based initiator in a concentration of 0.1 wt %.

Except for using the prepared water-based adhesive, a polarizing plate was fabricated using the method of Example 1. The adhesion, solubility with respect to water, and water resistance of the polarizing plate were evaluated and are presented in Table 1 below.

EXAMPLE 10

A water-based adhesive was prepared by dissolving the AH-PVA resin prepared in Example 1 in pure water in a concentration of 20 wt %, and then by adding 2-hydroxy-1-[4-(hydroxyethoxy)phenol]-2-methyl-1-propanone (Ciba-Geigy AG product Darocure 2959, D2959) in a concentration of 0.05 wt %.

Thereafter, a 80 μm thick saponified triacetyl cellulose (TAC) protective film was adhered to one surface of a 75 μm thick polyvinyl alcohol polarizer using prepared the water-based adhesive, and a polarizing plate was fabricated by curing at an intensity of 15 mW/cm$^2$ to 20 mW/cm$^2$ for 5 minutes using a UV source (EFOS product Novacure). The adhesion, solubility with respect to water, and water resistance of the polarizing plate were evaluated and are presented in Table 1 below.

EXAMPLE 11

A polyvinyl alcohol resin (average degree of polymerization of 600, degree of saponification of 95% to 97%, Nippon Synthetic Chemical Industry Co., Ltd., product z100) was dissolved in pure water at 80° C. for 1 hour, and then 60 parts by weight of 3,4-epoxycyclohexylmethyl acrylate (EMA) was added with respect to 100 parts by weight of the polyvinyl alcohol resin and stirred overnight at room temperature. As a result, a reaction like that of Reaction Formula 3 was performed such that EMA was chemically combined with the polyvinyl alcohol resin. An AH-PVA resin was obtained by separating and drying an obtained reaction product. Meanwhile, a pH level was controlled to about 1 to 2 by adding concentrated HCl during the reaction. Thereafter, the AH-PVA resin was analyzed by FT-IR and the presences of the introduced acrylate and formed OH— functional group were confirmed. Also, a content of the introduced EMA was calculated by using NMR and a polyvinyl alcohol resin was obtained in which 4.0 mol % of EMA was introduced.

Thereafter, a water-based adhesive was prepared by dissolving the prepared AH-PVA resin (average degree of polymerization of 600, degree of saponification of 95% to 97%, EMA content of 4.0 mol %) in a concentration of 4 wt % in pure water. The composition, contents, and physical properties of the adhesive are presented in Table 1 below.

Except for using the prepared water-based adhesive, a polarizing plate was fabricated using the method of Example 1. Thereafter, the adhesion, solubility with respect to water, and water resistance of the polarizing plate were evaluated and are presented in Table 1 below.

EXAMPLE 12

A polyvinyl alcohol resin (average degree of polymerization of 1700, degree of saponification of 95% to 97%, Nippon Synthetic Chemical Industry Co., Ltd., product Z320) was dissolved in pure water at 80° C. for 1 hour, and then 40 parts by weight of EMA was added with respect to 100 parts by weight of the polyvinyl alcohol resin and stirred overnight at room temperature. As a result, a reaction like that of Reaction Formula 3 was performed such that EMA was chemically combined with the polyvinyl alcohol resin. Meanwhile, a pH level was controlled to about 13 to 14 by adding 1N NaOH during the reaction. Thereafter, an AH-PVA resin was analyzed by FT-IR and the presences of the introduced acrylate and formed OH— functional group were confirmed. Also, a content of the introduced EMA was calculated by using NMR and a polyvinyl alcohol resin was obtained in which 1.5 mol % of EMA was introduced.

Thereafter, a water-based adhesive was prepared by dissolving the prepared AH-PVA resin (average degree of polymerization of 1700, degree of saponification of 95% to 97%, EMA content of 1.5 mol %) in a concentration of 4 wt % in pure water and by adding 15 parts by weight of a titanium amine complex (DuPont product TYZOR TE) as a cross-linking agent with respect to 100 parts by weight of the polyvinyl alcohol resin. The composition, contents, and physical properties of the adhesive are presented in Table 1 below.

Except for using the prepared water-based adhesive, a polarizing plate was fabricated using the method of Example 1. Thereafter, the adhesion, solubility with respect to water, and water resistance of the polarizing plate were evaluated and are presented in Table 1 below.

EXAMPLE 13

A polyvinyl alcohol resin (average degree of polymerization of 1100, degree of saponification of 99%, Nippon Synthetic Chemical Industry Co., Ltd., product Z210) was dissolved in pure water at 80° C. for 1 hour, and then 5 parts by weight of EMA was added with respect to 100 parts by weight of the polyvinyl alcohol resin and stirred overnight at room temperature. As a result, a reaction like that of Reaction Formula 3 was performed such that EMA was chemically combined with the polyvinyl alcohol resin. Meanwhile, a pH level was controlled to about 1 to 2 by adding concentrated HCl during the reaction. Thereafter, an AH-PVA resin was analyzed by FT-IR and the presences of the introduced acrylate and formed OH— functional group were confirmed. Also, a content of the introduced EMA was calculated by using NMR and a polyvinyl alcohol resin was obtained in which 0.12 mol % of EMA was introduced.

Thereafter, a water-based adhesive was prepared by dissolving the prepared AH-PVA resin (average degree of polymerization of 1100, degree of saponification of 99%, EMA content of 0.12 mol %) in a concentration of 4 wt % in pure water and by adding 15 parts by weight of a titanium amine complex (DuPont product TYZOR TE) as a cross-linking agent with respect to 100 parts by weight of the polyvinyl alcohol resin. The composition, contents, and physical properties of the adhesive are presented in Table 1 below.

Except for using the prepared water-based adhesive, a polarizing plate was fabricated using the method of Example 1. Thereafter, the adhesion, solubility with respect to water, and water resistance of the polarizing plate were evaluated and are presented in Table 1 below.

EXAMPLE 14

A polyvinyl alcohol resin (average degree of polymerization of 600, degree of saponification of 95% to 97%, Nippon Synthetic Chemical Industry Co., Ltd., product Z100) was dissolved in pure water at 80° C. for 1 hour, and then 60 parts by weight of EMA was added with respect to 100 parts by weight of the polyvinyl alcohol resin and stirred at 70° C. for 30 hours. As a result, a reaction like that of Reaction Formula 3 was performed such that EMA was chemically combined with the polyvinyl alcohol resin. Meanwhile, a pH level was controlled to about 13 to 14 by adding 1N NaOH during the reaction. Thereafter, an AH-PVA resin was analyzed by FT-IR and the presences of the introduced acrylate and formed OH-functional group were confirmed. Also, a content of the introduced EMA was calculated by using NMR and a polyvinyl alcohol resin was obtained in which 9 mol % of EMA was introduced.

Thereafter, a water-based adhesive was prepared by dissolving the prepared AH-PVA resin (average degree of polymerization of 600, degree of saponification of 95% to 97%, EMA content of 9 mol %) in a concentration of 4 wt % in pure water and by adding 15 parts by weight of a titanium amine complex (DuPont product TYZOR TE) as a cross-linking agent with respect to 100 parts by weight of the polyvinyl alcohol resin. The composition, contents, and physical properties of the adhesive are presented in Table 1 below.

Except for using the prepared water-based adhesive, a polarizing plate was fabricated using the method of Example 1. Thereafter, the adhesion, solubility with respect to water, and water resistance of the polarizing plate were evaluated and are presented in Table 1 below.

EXAMPLE 15

A polyvinyl alcohol resin (average degree of polymerization of 1700, degree of saponification of 95% to 97%, Nippon Synthetic Chemical Industry Co., Ltd., product Z320) was dissolved in pure water at 80° C. for 1 hour, and then a mixture of EMA and the polyvinyl alcohol resin was prepared by adding 0.001 parts by weight of EMA with respect to 100 parts by weight of the polyvinyl alcohol resin at room temperature. Thereafter, a water-based adhesive was prepared by dissolving the obtained mixture of EMA and polyvinyl alcohol resin in a concentration of 4 wt % (polyvinyl alcohol resin concentration of about 4 wt %) in pure water and by adding 20 parts by weight of a titanium amine complex (DuPont product TYZOR TE) as a cross-linking agent with respect to 100 parts by weight of the polyvinyl alcohol resin.

Except for using the prepared water-based adhesive, a polarizing plate was fabricated using the method of Example 1. Thereafter, the adhesion, solubility with respect to water, and water resistance of the polarizing plate were evaluated and are presented in Table 1 below.

EXAMPLE 16

A polyvinyl alcohol resin (average degree of polymerization of 1100, degree of saponification of 99%, Nippon Synthetic Chemical Industry Co., Ltd., product Z210) was dissolved in pure water at 80° C. for 1 hour, and then a mixture of EMA and the polyvinyl alcohol resin was prepared by adding 1.0 part by weight of EMA with respect to 100 parts by weight of the polyvinyl alcohol resin at room temperature. Thereafter, a water-based adhesive was prepared by dissolving the obtained mixture of EMA and polyvinyl alcohol resin in a concentration of 4 wt % (polyvinyl alcohol resin concentration of about 4 wt %) in pure water.

Except for using the prepared water-based adhesive, a polarizing plate was fabricated using the method of Example 1. The adhesion, solubility with respect to water, and water resistance of the polarizing plate were evaluated and are presented in Table 1 below.

EXAMPLE 17

A polyvinyl alcohol resin (average degree of polymerization of 600, degree of saponification of 95% to 97%, Nippon Synthetic Chemical Industry Co., Ltd., product Z100) was dissolved in pure water at 80° C. for 1 hour, and then a mixture of EMA and the polyvinyl alcohol resin was prepared by adding 10 parts by weight of EMA with respect to 100 parts by weight of the dissolved polyvinyl alcohol resin at room temperature. Thereafter, a water-based adhesive was prepared by dissolving the obtained mixture of EMA and polyvinyl alcohol resin in a concentration of 4 wt % (polyvinyl alcohol resin concentration of about 4 wt %) in pure water.

Except for using the prepared water-based adhesive, a polarizing plate was fabricated using the method of Example 1. The adhesion, solubility with respect to water, and water resistance of the polarizing plate were evaluated and are presented in Table 1 below.

EXAMPLE 18

A water-based adhesive was prepared by dissolving the AH-PVA resin prepared in Example 12 was dissolved in a concentration of 4 wt % in pure water, and then by adding an AIBN-based initiator (Wako Pure Chemical Industries, Ltd. product VA-004) in a concentration of 0.1 wt %.

Except for using the prepared water-based adhesive, a polarizing plate was fabricated using the method of Example 1. The adhesion, solubility with respect to water, and water resistance of the polarizing plate were evaluated and are presented in Table 1 below.

EXAMPLE 19

A water-based adhesive was prepared by dissolving the AH-PVA resin prepared in Example 12 in a concentration of 20 wt % in pure water, and then by adding ammonium persulfate (Junsei Chemical Co., Ltd.) as a sulfate-based initiator in a concentration of 0.1 wt %.

Except for using the prepared water-based adhesive, a polarizing plate was fabricated using the method of Example 1. The adhesion, solubility with respect to water, and water resistance of the polarizing plate were evaluated and are presented in Table 1 below.

EXAMPLE 20

A water-based adhesive was prepared by dissolving the AH-PVA resin prepared in Example 11 in a concentration of wt % in pure water, and then by adding 2-hydroxy-1-[4-(hydroxyethoxy)phenol]-2-methyl-1-propanone (Ciba-Geigy AG product Darocure 2959, D2959) in a concentration of 0.05 wt %.

Thereafter, a 80 μm thick saponified triacetyl cellulose (TAC) protective film was adhered to one surface of a 75 μm thick polyvinyl alcohol polarizer using the water-based adhesive, and a polarizing plate was fabricated by curing at an intensity of 15 mW/cm$^2$ to 20 mW/cm$^2$ for 5 minutes using a UV source (EFOS product Novacure). The adhesion, solubility with respect to water, and water resistance of the polarizing plate were evaluated and are presented in Table 1 below.

EXAMPLE 21

A polyvinyl alcohol resin (average degree of polymerization of 1100, degree of saponification of 99%, Nippon Synthetic Chemical Industry Co., Ltd., product Z210) was dissolved in pure water at 80° C. for 1 hour, and then a mixture of phenylglycidyl metacrylate (PGMA) of the following Chemical Formula and the polyvinyl alcohol resin was prepared by adding 0.1 parts by weight of PGMA with respect to 100 parts by weight of the dissolved polyvinyl alcohol resin at room temperature. Thereafter, a water-based adhesive was prepared by dissolving the obtained mixture of PGMA and polyvinyl alcohol resin in a concentration of 4 wt % (polyvinyl alcohol resin concentration of about 4 wt %) in pure water.

Except for using the prepared water-based adhesive, a polarizing plate was fabricated using the method of Example 1. The adhesion, solubility with respect to water, and water resistance of the polarizing plate were evaluated and are presented in Table 1 below.

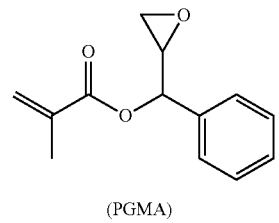 [SMILES: C=C(C)C(=O)OC(c1ccccc1)C1CO1]

(PGMA)

EXAMPLE 22

A polyvinyl alcohol resin (average degree of polymerization of 600, degree of saponification of 95% to 97%, Nippon Synthetic Chemical Industry Co., Ltd., product Z100) was dissolved in pure water at 80° C. for 1 hour, and then a mixture of (3H-pyrrol-4-yl)-3,4-epoxycyclohexylmethyl acrylate (PECMA) of the following Chemical Formula and the polyvinyl alcohol resin was prepared by adding 0.1 parts by weight of PECMA with respect to 100 parts by weight of the dissolved polyvinyl alcohol resin at room temperature. Thereafter, a water-based adhesive was prepared by dissolving the obtained mixture of PECMA and polyvinyl alcohol resin in a concentration of 4 wt % (polyvinyl alcohol resin concentration of about 4 wt %) in pure water.

Except for using the prepared water-based adhesive, a polarizing plate was fabricated using the method of Example 1. The adhesion, solubility with respect to water, and water resistance of the polarizing plate were evaluated and are presented in Table 1 below.

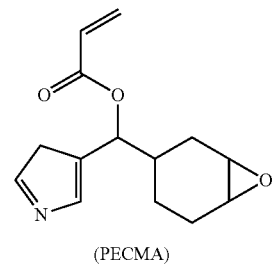 [SMILES: C=CC(=O)OC(C1=CN=CC1)C1CCC2OC2C1]

(PECMA)

COMPARATIVE EXAMPLE 1

A polyvinyl alcohol resin (average degree of polymerization of 1100, degree of saponification of 99%, Nippon Synthetic Chemical Industry Co., Ltd., product Z210) with 3 mol % of an acetoacetyl group introduced was used as a water-based adhesive. Except for using the water-based adhesive prepared by dissolving the Z210 polyvinyl alcohol resin with the introduced acetoacetyl group in a concentration of 4 wt % in pure water, a polarizing plate was fabricated using the method of Example 1. The adhesion, solubility with respect to water, and water resistance of the polarizing plate were evaluated and are presented in Table 1 below.

COMPARATIVE EXAMPLE 2

Except for using an adhesive which is prepared by adding 20 parts by weight of a titanium amine complex (DuPont product TYZOR TE) as a cross-linking agent to 100 parts by weight of the Z210 polyvinyl alcohol resin with 3 mol % of the introduced acetoacetyl group of Comparative Example 1, a polarizing plate was fabricated using the method of Example 1. The adhesion, solubility with respect to water, and water resistance of the polarizing plate were evaluated and are presented in Table 1 below.

COMPARATIVE EXAMPLE 3

Except for using an adhesive which is prepared by adding 20 parts by weight of a zirconium amine complex (Daichi Kigenso Kagaku Kogyo product AC-7) as a cross-linking agent to 100 parts by weight of the Z210 polyvinyl alcohol resin with 3 mol % of the introduced acetoacetyl group of Comparative Example 1, a polarizing plate was fabricated using the method of Example 1. The adhesion and water resistance of the polarizing plate were evaluated and are presented in Table 1 below.

COMPARATIVE EXAMPLE 4

Except for using an adhesive which is prepared by adding 12 parts by weight of GMA to 100 parts by weight of a polyvinyl alcohol-based resin (average degree of polymerization of 600, degree of saponification of 95% to 97%, Nippon Synthetic Chemical Industry Co., Ltd., product Z100), a polarizing plate was fabricated using the method of Example 5. The adhesion and water resistance of the polarizing plate were evaluated and are presented in Table 1 below.

COMPARATIVE EXAMPLE 5

Except for using an adhesive which is prepared by adding 11 parts by weight of EMA to 100 parts by weight of a polyvinyl alcohol-based resin (average degree of polymerization of 1100, degree of saponification of 99%, Nippon Synthetic Chemical Industry Co., Ltd., product Z210), a polarizing plate was fabricated using the method of Example 15. The adhesion, solubility with respect to water, and water resistance of the polarizing plate were evaluated and are presented in Table 1 below.

COMPARATIVE EXAMPLE 6

A polyvinyl alcohol resin (average degree of polymerization of 1100, degree of saponification of 99%, product of Nippon Synthetic Chemical Industry Co., Ltd., product Z210) was dissolved in pure water at 80° C. for 1 hour, and then 30 parts by weight of acryloyl chloride was added with respect to 100 parts by weight of the polyvinyl alcohol resin at room temperature. Acryloyl was chemically combined with the polyvinyl alcohol resin by stirring at a temperature range of 35° C. to 40° C. A polyvinyl alcohol resin with the introduced acryloyl group was obtained by separating and drying an obtained reaction product. Thereafter, the presence of the introduced acryloyl group was confirmed by analyzing the obtained polyvinyl alcohol resin with the introduced acryloyl group with FT-IR. Also, a content of the introduced acryloyl group was calculated by using NMR.

Thereafter, a water-based adhesive was prepared by dissolving the obtained polyvinyl alcohol resin with the introduced acryloyl group (acryloyl group concentration of 10 mol %) in a concentration of 4 wt % in pure water.

Except for using the prepared water-based adhesive, a polarizing plate was fabricated using the method of Example 1. The adhesion, solubility with respect to water, and water resistance of the polarizing plate were evaluated and are presented in Table 1 below.

COMPARATIVE EXAMPLE 7

An acrylic copolymer solution was obtained through polymerization in toluene by adding 0.1 parts by weight of benzoyl peroxide as a polymerization initiator with respect to 100 parts by weight of a mixture of 2-hydroxyethyl acrylate and acrylic acid in a weight ratio of 1:1.

1.0 part by weight of glycerol diglycidyl ether and 2.0 parts by weight of a zirconium amine compound (Daichi Kigenso Kagaku Kogyo product AC-7) as a cross-linking agent were added with respect to 100 parts by weight of a solid content of the copolymer solution and stirred sufficiently at room temperature for 2 hours, and then an adhesive was obtained by controlling a solid content of the copolymer resin to 5 wt %. The solid content of the copolymer resin was controlled by adding or evaporating toluene.

Except for using the adhesive solution obtained by the foregoing method, a polarizing plate was fabricated using the method of Example 1. The adhesion, solubility with respect to water, and water resistance of the polarizing plate were evaluated and are presented in Table 1 below.

When the adhesive of the present Comparative Example was used, the adhesion, solubility with respect to water, and water resistance of the polarizing plate were poor as shown in Table 1 below. Also, after coating the adhesive of this Comparative Example, toluene was insufficiently removed during a drying process because toluene as an organic solvent of the adhesive does not penetrate the polarizer and TAC protective film. Therefore, a normal polarizing plate was not fabricated.

COMPARATIVE EXAMPLE 8

348 parts by weight of 3-hydroxymethyl-3-ethyl oxethane and 348 parts by weight of propylene oxide were mixed, dissolved in 1 liter of diethyl ether, and cooled in an ice bath at −14° C. Thereafter, 5.5 parts by weight of a 60 wt % $HPF_6$ aqueous solution as a polymerization initiator was added dropwise to the mixed solution for 10 minutes. Subsequently, a reaction was performed overnight on the mixed solution at room temperature and the polymerization initiator was deactivated by adding 9 parts by weight of a 30 wt % $NaOCH_3$ methanol solution (solution dissolved in a ratio of 30 g of $NaOCH_3$ to 70 g of MeOH) on the next day. A polymerized reaction product was removed by filtration after the deactivation of the polymerization initiator. Diethyl ether in a polymerized reaction product was removed by heating at 75° C. and polyether polyol was obtained. The polyether polyol has an average molecular weight of 3500.

An adhesive solution having a resin solid content of 5 wt % was obtained by adding 5.0 parts by weight of glycerol diglycidyl ether with respect to 100 parts by weight of a polyether polyol obtained by the foregoing reaction in pure water and by stirring sufficiently at room temperature for 2 hours. Except for using the adhesive solution obtained by the foregoing method, a polarizing plate was fabricated using the method of Example 1. The adhesion, solubility with respect to water, and water resistance of the polarizing plate were evaluated and are presented in Table 1 below.

COMPARATIVE EXAMPLE 9

5 parts by weight of a copolymer resin copolymerized a polyvinyl alcohol (average degree of polymerization of 600, degree of saponification of 95% to 97%, Nippon Synthetic Chemical Industry Co., Ltd., product Z100) and 2-hydroxyethyl acrylate in a weight ratio of 85/15 was mixed with 95 parts by weight of water, and then dissolved by heating. An adhesive (a resin solid content of about 4.8 wt %) was obtained by adding 3.0 parts by weight of a zirconium amine compound (Daichi Kigenso Kagaku Kogyo product AC-7) as a cross-linking agent thereto and stirring sufficiently at room temperature for 2 hours. Except for using the adhesive solution obtained by the foregoing method, a polarizing plate was fabricated using the method of Example 1. The adhesion, solubility with respect to water, and water resistance of the polarizing plate were evaluated and are presented in Table 1 below.

COMPARATIVE EXAMPLE 10

A polyvinyl alcohol resin (average degree of polymerization of 1100, degree of saponification of 99%, Nippon Synthetic Chemical Industry Co., Ltd., product Z210) was dissolved in pure water at 80° C. for 1 hour, and then a mixture of GMA and the polyvinyl alcohol resin was prepared by adding 15 parts by weight of GMA with respect to 100 parts by weight of the dissolved polyvinyl alcohol resin at room temperature. Thereafter, an adhesive solution was obtained by dissolving the obtained mixture of GMA and polyvinyl alcohol resin in pure water to have a polyvinyl alcohol resin content of 4 wt % and stirring.

Except for using the adhesive solution obtained by the foregoing method, a polarizing plate was fabricated using the method of Example 1. The adhesion, solubility with respect to water, and water resistance of the polarizing plate were evaluated and are presented in Table 1 below.

Physical Property Evaluation

Physical properties with respect to the adhesives and polarizing plates of Examples and Comparative Examples were measured by the following method.

(1) Fourier Transform Infrared Spectroscopy (FT-IR) Measurement.

Absorbance was measured using Excalibur 3100 available from a Varian, Inc. (USA) and the presence of a modified PVA resin was confirmed.

(2) Nuclear Magnetic Resonance (NMR) Measurement.

A structural analysis of the prepared modified polyvinyl alcohol resin and a calculation of substitution (modification) contents were performed by using Unity Inova 500 available from a Varian, Inc. (USA) Unity Inova 500.

(3) Adhesion

Adhesion between the polarizer and protective film in the polarizing plate was measured by using a texture analyzer (TA, Stable Micro Systems, UK).

<Evaluation Criteria>
⊚: 5 N/cm≤adhesion (adhesion was 5 N/cm or more)
○: 4 N/cm≤adhesion≤5 N/cm (adhesion was 4 N/cm or more and less than 5 N/cm)
Δ: 3 N/cm≤adhesion≤4 N/cm (adhesion was 3 N/cm or more and less than 4 N/cm)
X: adhesion<3 N/cm (adhesion was less than 3 N/cm)

(4) Solubility with Respect to Water

The adhesive solution compositions of each Example and Comparative Example were stirred at room temperature for 1 hour, and then the solubilities of the PVA resins with respect to water were evaluated visually. The solubilities were evaluated visually by observing the presence of precipitate formation and the degree of turbidity. The solubility with respect to water was good when precipitates are not formed and the aqueous solution was transparent.

<Evaluation Criteria>
○ (good)—no precipitate, transparent
Δ (inferior)—no precipitate, turbid
X (poor)—precipitate formation, turbid (5) Water Resistance and Humidity Resistance An acrylate adhesive for a polarizing plate was coated on one surface of a triacetyl cellulose film of a polarizing plate. The adhesive coated polarizing plate was cut into a size of 50 mm×80 mm. At this time, an elongation direction of the polarizing film was selected as a major axis and the direction orthogonal thereto was selected as a minor axis. Samples were prepared by stacking the polarizing plate on glass by the medium of the coated adhesive, and then water resistance was evaluated.

Water resistance was evaluated by measuring the degree of delamination (separation between the protective film and the polarizer) when the samples were left standing for 8 hours at a temperature of 60° C. and at a relative humidity of 100% (use a constant temperature bath).

An amount peeled from an end of the polarizing plate was measured and the degree of delamination was confirmed by an area ratio of the amount of peeling with respect to the sample size. The smaller the degree of delamination, the better the water resistance. Results of the physical property evaluations with respect to the polarizing plates of Examples and Comparative Examples are presented in Table 1 below.

<Evaluation Criteria>
⊚ (very good)—delamination area<10% (delamination area less than 10%)
○ (good)—10%≤delamination area≤50% (delamination area 10% or more and less than 50%)
Δ (inferior)—50%≤delamination area≤100% (delamination area 50% or more and less than 100%)
X (poor)—100% delamination

TABLE 1

| Category | Adhesive composition | Adhesion | Solubility with respect to water | Water resistance |
|---|---|---|---|---|
| Example 1 | PVA with 4.5 mol % of GMA introduced | ⊚ | ○ | ⊚ |
| Example 2 | PVA with 2.0 mol % of GMA introduced | ⊚ | ○ | ⊚ |
| Example 3 | PVA with 0.15 mol % of GMA introduced | ⊚ | ○ | ⊚ |
| Example 4 | PVA with 10 mol % of GMA introduced | ⊚ | ○ | ⊚ |
| Example 5 | 0.001 parts by weight of GMA included | ⊚ | ○ | ⊚ |
| Example 6 | 1.0 part by weight of GMA included | ⊚ | ○ | ⊚ |

TABLE 1-continued

| Category | Adhesive composition | Adhesion | Solubility with respect to water | Water resistance |
|---|---|---|---|---|
| Example 7 | 10 parts by weight of GMA included | ◎ | ○ | ◎ |
| Example 8 | AH-PVA resin of Example 2/0.1 wt % of an AIBN-based initiator | ◎ | ○ | ◎ |
| Example 9 | AH-PVA resin of Example 2/0.1 wt % of a sulfate-based initiator | ◎ | ○ | ◎ |
| Example 10 | AH-PVA resin of Example 1/0.05 wt % of a photoinitiator | ◎ | ○ | ◎ |
| Example 11 | PVA with 4.0 mol % of EMA introduced | ◎ | ○ | ◎ |
| Example 12 | PVA with 1.5 mol % of EMA introduced | ◎ | ○ | ◎ |
| Example 13 | PVA with 0.12 mol % of EMA introduced | ◎ | ○ | ◎ |
| Example 14 | PVA with 9 mol % of EMA introduced | ◎ | ○ | ◎ |
| Example 15 | 0.001 parts by weight of EMA included | ◎ | ○ | ◎ |
| Example 16 | 1.0 part by weight of EMA included | ◎ | ○ | ◎ |
| Example 17 | 10 parts by weight of EMA included | ◎ | ○ | ◎ |
| Example 18 | AH-PVA resin of Example 12/0.1 wt % of an AIBN-based initiator | ◎ | ○ | ◎ |
| Example 19 | AH-PVA resin of Example 12/0.1 wt % of a sulfate-based initiator | ◎ | ○ | ◎ |
| Example 20 | AH-PVA resin of Example 11/0.05 wt % of a photoinitiator | ◎ | ○ | ◎ |
| Example 21 | 0.1 parts by weight of PGMA included | ◎ | ○ | ◎ |
| Example 22 | 0.1 parts by weight of PECMA included | ◎ | ○ | ◎ |
| Comparative Example 1 | PVA with 3 mol % of an acetoacetyl group introduced | X | ○ | X |
| Comparative Example 2 | 100 parts by weight of the adhesive resin of Example 1/20 parts by weight of TYZOR TE | Δ | ○ | Δ |
| Comparative Example 3 | 100 parts by weight of the adhesive resin of Example 1/20 parts by weight of AC-7 | Δ | ○ | ○ |
| Comparative Example 4 | Include 12 parts by weight of GMA | X | X | Δ |
| Comparative Example 5 | Include 11 parts by weight of EMA | X | X | Δ |
| Comparative Example 6 | PVA resin with 10 mol % of an acryloyl group introduced (degree of polymerization of PVA 1100) | X | X | Δ |
| Comparative Example 7 | Polyacrylate resin | X | X | X |
| Comparative Example 8 | Polyether polyol adhesive resin | X | Δ | Δ |
| Comparative Example 9 | Copolymer resin of PVA and 2-hydroxyethyl acrylate | Δ | ○ | X |
| Comparative Example 10 | 100 parts by weight of PVA/15 parts by weight of GMA | Δ | ○ | X |

As shown in Table 1, it may be confirmed that the adhesive for a polarizing plate according to the present invention has excellent properties of adhesion, solubility with respect to water, and water resistance.

While the present invention has been shown and described in connection with the exemplary embodiments, it will be apparent to those skilled in the art that modifications and variations can be made without departing from the spirit and scope of the invention as defined by the appended claims.

The invention claimed is:
1. A polarizing plate comprising a polarizer and a protective film adhered to each other with an adhesive, the adhesive comprising:
a modified polyvinyl alcohol comprising a polyvinyl alcohol-based resin having a weight average molecular weight of 20,000 to 100,000, modified with an acrylic group introduced thereto and comprising a hydroxyl group formed by introduction of the acrylic group, the modified polyvinyl alcohol-based resin consisting of: (i) a repeating unit of Chemical Formula A, (ii) 0.1 mol % to 50 mol %, with respect to 100 mol % of total modified polyvinyl alcohol-based resin, of at least one repeating unit selected from Chemical Formula B1, Chemical Formula B2, and Chemical Formula B3, and (iii) a repeating unit of Chemical Formula C, wherein

[Chemical Formula A]

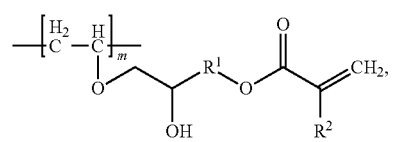

[Chemical Formula B1]

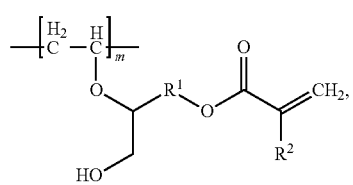

[Chemical Formula B2]

-continued

[Chemical Formula B3]

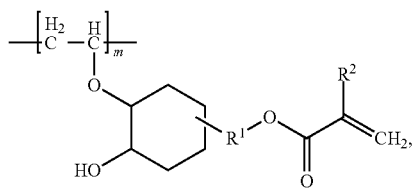

[Chemical Formula C]

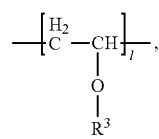

in which n is an integer between about 490 and about 1700; m is an integer between about 10 and about 900; n+m is an integer between about 500 and about 1800; $R^1$ is substituted or unsubstituted $C_1$-$C_{20}$ alkandiyl, a substituted or unsubstituted 5- to 7-membered cyclic group, a substituted or unsubstituted 5- to 7-membered heterocyclic group including a heteroatom selected from the group consisting of N, S, or O, a substituted or unsubstituted $C_6$-$C_{14}$ aromatic group, or a substituted or unsubstituted 5- to 7-membered heteroaromatic group including at least one heteroatom selected from the group consisting of N, S, or O; and $R^2$ is a substituted or unsubstituted $C_1$-$C_{20}$ alkyl group, a substituted or unsubstituted 5- to 7-membered cyclic group, a substituted or unsubstituted 5- to 7-membered heterocyclic group including at least one heteroatom selected from the group consisting of N, S, or O, a substituted or unsubstituted $C_6$-$C_{14}$ aromatic group, or a substituted or unsubstituted 5- to 7-membered heteroaromatic group including at least one heteroatom selected from the group consisting of N, S, or O; and when $R^1$ and $R^2$ are substituted with a substituent, the substituent is a $C_1$-$C_{20}$ alkyl group, a halogen atom selected from the group consisting of F, Cl, Br, or I, a 5- to 7-membered cyclic group, a 5- to 7-membered heterocyclic group including at least one heteroatom selected from the group consisting of N, S, or O, a $C_6$-$C_{14}$ aromatic group, or a 5- to 7-membered heteroaromatic group including at least one heteroatom selected from the group consisting of N, S, or O, and 1 is an integer between about 1 and 80, and $R^3$ is a carboxylic acid group, an acrylic group, or a urethane group, wherein the modified polyvinyl alcohol-based resin is obtained by performing a reaction between the polyvinyl alcohol-based resin and about 0.001 to 10 parts by weight, with respect to 100 parts by weight of the polyvinyl alcohol-based resin, of a compound having an epoxy group and an acrylic group, and an initiator selected from the group consisting of 2,2'-azo-bis(isobutyronitrile) (AIBN)-based and persulfate-based water-soluble initiators, and wherein the modified polyvinyl alcohol-based resin is free of acetocetyl groups.

2. The polarizing plate of claim 1, wherein a sum of the number n of the repeating unit of Chemical Formula A and the number 1 of the repeating unit of Chemical Formula C is an integer between about 490 and about 1700, the number 1 of the repeating unit of Chemical Formula C in the sum of n and 1 is an integer between about 1 and about 80, the number m of the repeating unit of Chemical Formulas B1, B2 and_B3 is an integer between about 10 and about 900, and a sum of n, m, and 1 is an integer between about 500 and about 1800.

3. The polarizing plate of claim 1, wherein an average degree of polymerization of the polyvinyl alcohol-based resin is in a range of about 500 and about 1800.

4. The polarizing plate of claim 1, wherein the compound having an epoxy and an acrylic group is represented as Chemical Formula 2:

[Chemical Formula 2]

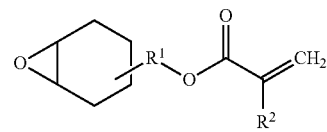

in which $R^1$ is substituted or unsubstituted $C_1$-$C_{20}$ alkandiyl, a substituted or unsubstituted 5- to 7-membered cyclic group, a substituted or unsubstituted 5- to 7-membered heterocyclic group including a heteroatom selected from the group consisting of N, S, or O, a substituted or unsubstituted $C_6$-$C_{14}$ aromatic group, or a substituted or unsubstituted 5- to 7-membered heteroaromatic group including at least one heteroatom selected from the group consisting of N, S, or O; $R^2$ is a substituted or unsubstituted $C_1$-$C_{20}$ alkyl group, a substituted or unsubstituted 5- to 7-membered cyclic group, a substituted or unsubstituted 5- to 7-membered heterocyclic group including at least one heteroatom selected from the group consisting of N, S, or O, a substituted or unsubstituted $C_6$-$C_{14}$ aromatic group, or a substituted or unsubstituted 5- to 7-membered heteroaromatic group including at least one heteroatom selected from the group consisting of N, S, or O; and when $R^1$ and $R^2$ are substituted with a substituent, the substituent is a $C_1$-$C_{20}$ alkyl group, a halogen atom selected from the group consisting of F, Cl, Br, or I, a 5- to 7-membered cyclic group, a 5- to 7-membered heterocyclic group including at least one heteroatom selected from the group consisting of N, S, or O, a $C_6$-$C_{14}$ aromatic group, or a 5- to 7-membered heteroaromatic group including at least one heteroatom selected from the group consisting of N, S, or O.

5. The polarizing plate of claim 1, wherein the initiator is added to a maximum of about 10 wt %.

6. The polarizing plate of claim 1, wherein the modified polyvinyl alcohol-based resin is water soluble.

7. The polarizing plate of claim 1, wherein the adhesive is water soluble.

8. A display device comprising the polarizing plate of claim 1.

* * * * *